United States Patent
Isaacson (10) Patent No.: US 7,198,396 B2
(45) Date of Patent: Apr. 3, 2007

(54) APPARATUS FOR PROVIDING LIGHT IN A STRUCTURE

(76) Inventor: Chris Isaacson, 365 1/2 Ocean View Ave., Encinitas, CA (US) 92024

( * ) Notice: Subject to any disclaimer, the term of this patent is extended or adjusted under 35 U.S.C. 154(b) by 173 days.

(21) Appl. No.: 10/914,790

(22) Filed: Aug. 10, 2004

(65) Prior Publication Data

US 2005/0007790 A1    Jan. 13, 2005

Related U.S. Application Data

(63) Continuation-in-part of application No. 10/213,521, filed on Aug. 8, 2002, now Pat. No. 6,840,662.

(51) Int. Cl.
*F21V 7/04* (2006.01)

(52) U.S. Cl. .................. 362/552; 362/554; 362/555

(58) Field of Classification Search ............... 362/551, 362/552, 554, 555, 556, 580, 558, 559, 576, 362/581; 315/185 S, 200 A, 312, 323; 385/117
See application file for complete search history.

(56) References Cited

U.S. PATENT DOCUMENTS

| | | | | |
|---|---|---|---|---|
| 5,535,230 A | * | 7/1996 | Abe | 362/259 |
| 6,198,872 B1 | * | 3/2001 | Lipson et al. | 362/555 |
| 6,840,662 B2 | * | 1/2005 | Isaacson et al. | 362/555 |
| 6,858,993 B2 | * | 2/2005 | Lee et al. | 315/185 S |
| 7,018,084 B2 | * | 3/2006 | Gotfried | 362/576 |

* cited by examiner

*Primary Examiner*—Sandra O'Shea
*Assistant Examiner*—Bao Q. Truong
(74) *Attorney, Agent, or Firm*—Palomar Patent; Calif Tervo; Mary Jo Redman (57) ABSTRACT

Described herein is an apparatus for providing light to a structure consisting of a plurality of fibers, each said optical fiber having an emitting end and a receiving end, the emitting ends of the optical fibers for mounting in the plurality of apertures in the structure. The receiving ends of the optical fibers span to an enclosure for receiving a control circuit and a plurality of LEDs. The control circuit generates an oscillating sequence of signals for controlling the intensity of illumination of at least one of the LED's between at least two levels of illumination.

22 Claims, 8 Drawing Sheets

APPARATUS FOR PROVIDING LIGHT IN A STRUCTURE

This invention is a Continuation-In Part of patent application Ser. No. 10/213,521 filed Aug. 8, 2002 now U.S. Pat. No. 6,840,662.

FIELD OF THE INVENTION

This invention relates to an apparatus for distribtuing light in a preset pattern across the surface of a structure, and more particularly to a light apparatus for creating a special effect on a structure.

BACKGROUND OF THE INVENTION

Indoor structures that simulate outdoor environments are used, for example, in dioramas, theaters, and planetaria. Such structures used in dioramas and theaters typically involve ceilings painted either blue to simulate daylight sky or black with painted stars to simulate night sky. Such structures used in planetaria typically include extremely elaborate optical equipment used to project star patterns on a concave surface from a projector located in the same room as the concave surface for the benefit of an audience located in the same room as the concave surface. The former types of structures, however, are not very realistic, and the latter type of structure is extremely expensive. U.S. Pat. No. 4,953,848 to Braunstein describes and claims an indoor structure that simulates an outdoor environment wherein an apparatus for providing an illusion of either a daytime or a nighttime sky in an indoor structure consisting of at least one transparent window that appears to be a window to the outside. The room has a ceiling that slants from a high end at or adjacent the front wall to a low end removed from the front wall, the ceiling having an aperture in it, with a concave dome on the outside of the ceiling covering the aperture. The inside surface of the concave dome is light reflecting. Means is provided for shining light of appropriate colors on the light-reflecting, inside surface of the concave dome. The source of the light is concealed from a viewer located on the outside of the front wall.

"U.S. Pat. No. 6,198,872 to Lipson et al. describes a planar advertising display or point-of-purchase display having portions that are selectively illuminable. The display includes an electronic circuit assembly capable of distributing current to each of a plurality of loads pursuant to a pre-programmed sequence. The electronic circuit assembly may include a pre-programmed or programmable integrated circuit chip or a microprocessor that is programmed to sequentially direct electrical current to each of a plurality of electrically conductive wires. The integrated circuit chip and other components on the circuit board may function as an array of solid state switches for alternately permitting or interrupting the flow of current from a power source to each of a plurality of electrically conductive wires. The display further includes a plurality of light emitting diodes that are connected respectively to ends of the electrically conductive wires remote from the circuit board. Thus, current from the wires will selectively activate the light emitting diodes and thereby cause pulses of light to be generated in accordance with a pattern that is dictated by the programmed or programmable components of the circuitry. However, recent studies of LEDs has shown that configurations such as that described in Lipson et al. cause a degradation of the LEDs due to the internal heat generated by such devices, and that the life span of the LEDs are significantly reduced.

The instant invention describes a configuration and wiring system that overcomes the problems of the prior art and produces a controlled light enhancement that provides an asthetic appearance and technology that extends the life span of the LEDs. Neither of the above-described patents provide an apparatus for installation in a home, restaurant or other structure that realistically simulates a nighttime sky.

OBJECTS OF THE INVENTION

It is a principal object of the invention to provide a simple, inexpensive lighting apparatus that provides a very realistic simulation of a nighttime sky or other selected configuration. It is a further object of the invention to provide a lighting apparatus that provides a distribution of light patterns in a selected geometrical configuration.

SUMMARY OF THE INVENTION

The inventor has discovered a lighting apparatus for creating a selected light pattern in a house, restaurant or other structure or surface consisting of a means of simulating any selected light pattern on the internal surface of the structure. The light system, consisting of an array of light emitting diodes (LED) and fiber optics, is completely hidden from a viewer located in the structure. The apparatus includes means for dissipating heat generated by the LEDs. For the purposes of this invention the apparatus of the invention will be shown as applied to a prefabricated architectual dome, however, the dome is not an integral part of the invention. The lighting apparatus can be applied to other structures and surfaces, such as a ceiling or other surface of a structure. Concomitantly, the invention may be added to the frame of a picture or other artwork to provide the desired effect.

DESCRIPTION OF THE DRAWINGS

The invention will be better understood and its numerous objects and advantages will be apparent by reference to the following detailed description of the invention when taken in conjunction with the following drawings.

DETAILED DESCRIPTION OF THE INVENTION

Figure 1:
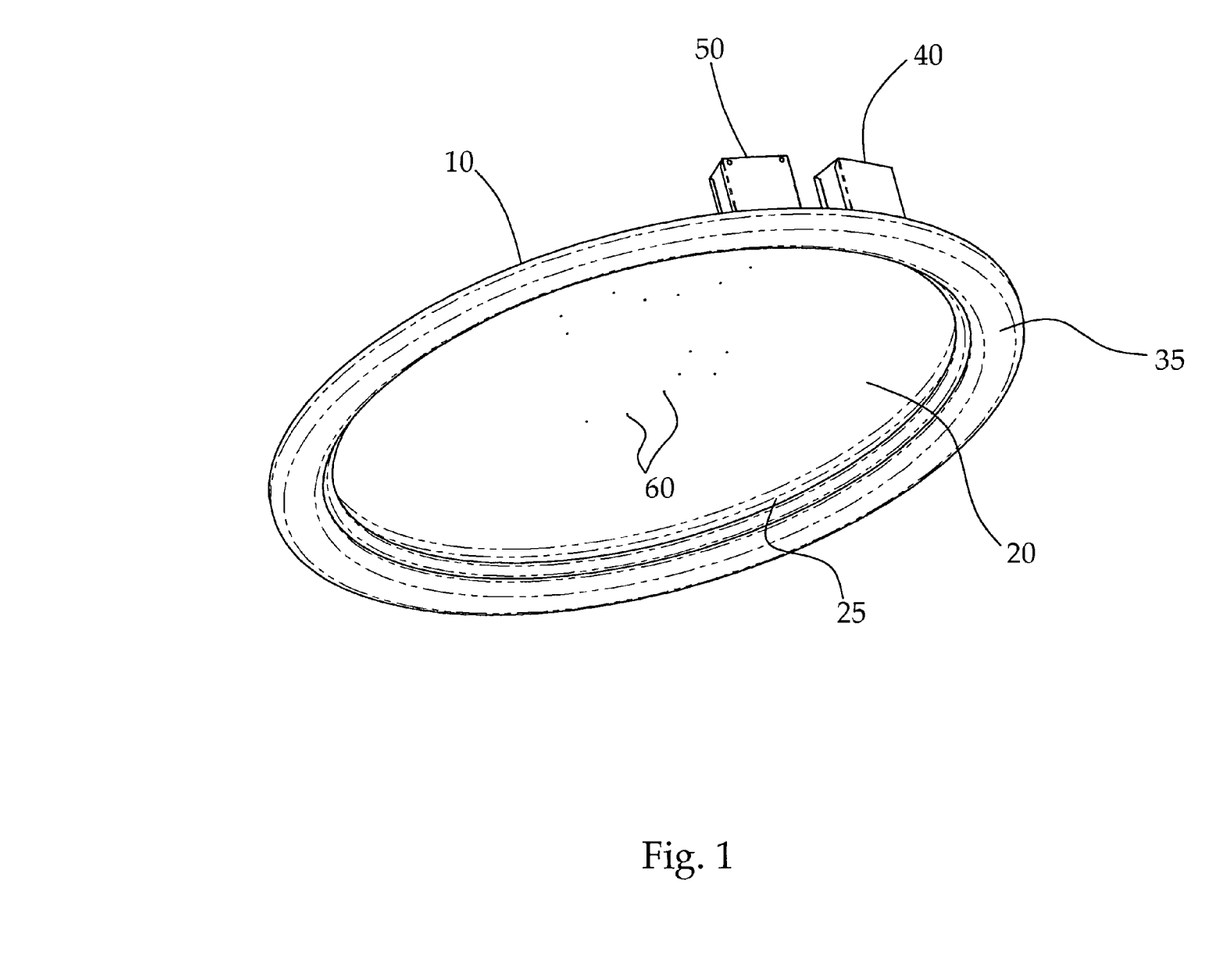
FIG. 1 is a bottom perspective view of a dome structure showing the distribution of apertures across the internal surface of the dome as seen by a viewer.
Figure 2:
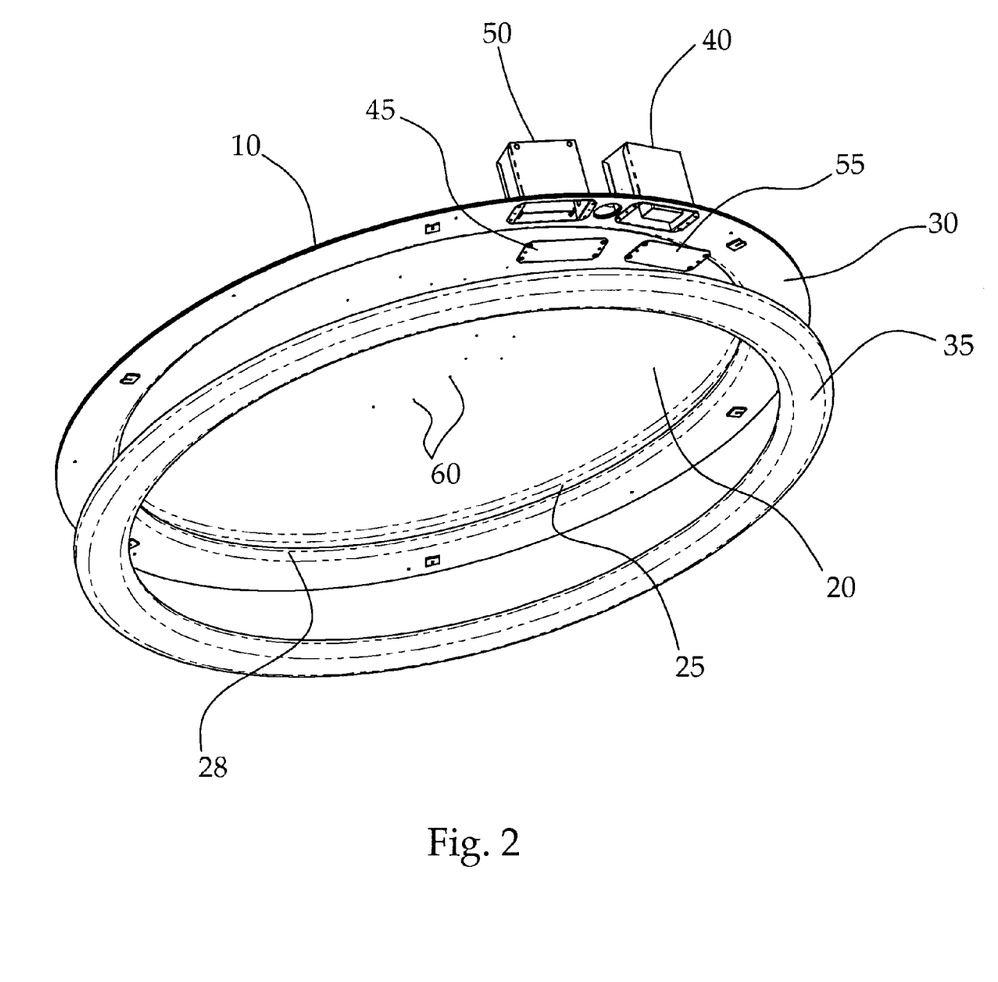
FIG. 2 is a bottom perspective view of the dome structure having a decorative flange displaced from the main dome section.
Figure 3:
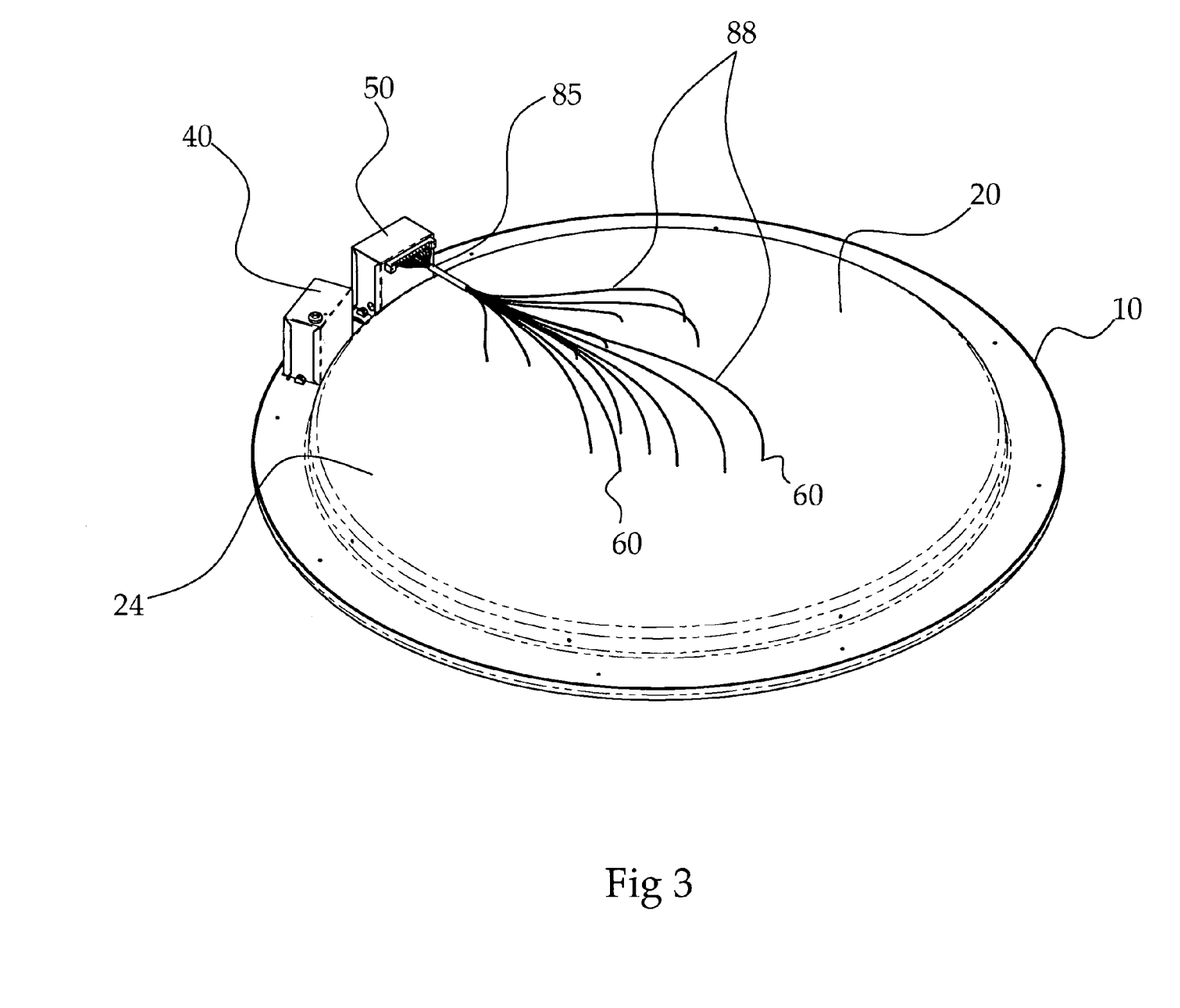
FIG. 3 is a top perspective view of the dome structure showing distribution of the fiber optics.

FIGS. 1 and 2 show a dome 10 having a concave dome section 20 having an inner surface 22, a skirt 25, an outer rim 30, and a decorative cover 35. Mounted on the upper surface of outer rim 30 are power junction box 40 and circuitry enclosure 50. On the inner surface 22 is shown a plurality of holes 60 for receiving fiber optic strands 88. FIG. 3 is a perspective view of the upper, outer surface of concave dome section 20. Fiber optic system 85 is comprised of plurality of fiber optic bundles and strands 88 which are distributed over the outer surface 24, inserted in holes 60 so that the tip of the fiber optic strands 88 are substantially flush with the inner surface 22 of the dome 10, and such that fiber optic strands 88 may slightly recede or protrude in holes 60. Included within the internal periphery of dome section 20, and adjacent skirt 25, is soffit 28 (FIG. 2), formed to receive light source 29 for indirectly lighting the internal surface 22.

Fiber optic bundles 85 may each consist of either a plurality of fiber optic strands, single fiber optic strands, or a combination thereof. One of ordinary skill in the art would know that fiber optic strands 88 are commercially available from several sources, and are known for use with LEDs. Such fiber optic strands 88 may be flexible light pipes as are available from Mitsubishi, sold as PMMA fiber, and equivalents. Holes 60 may be formed in any desired pattern. In this preferred embodiment, the hole pattern describes the stars of the midnight sky, however, any desired pattern may be select. It can be seen in FIG. 1 that the hole patterns describe the Big and Little Dippers. Once the fiber optic strands are inserted in the holes 60 they are secured in place with an adhesive.

Figure 4:
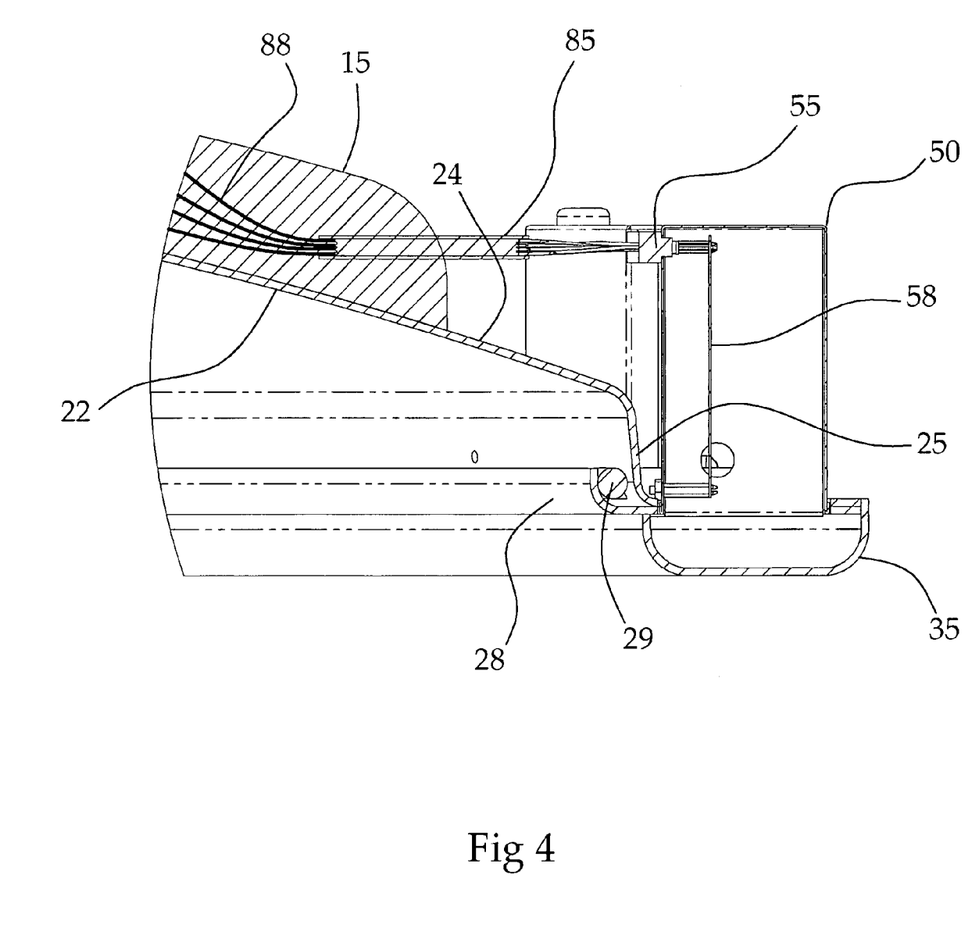
FIG. 4 is a side sectional view of the dome showing the interior of the housing for the circuit board and LEDs of the invention.
Figure 5:
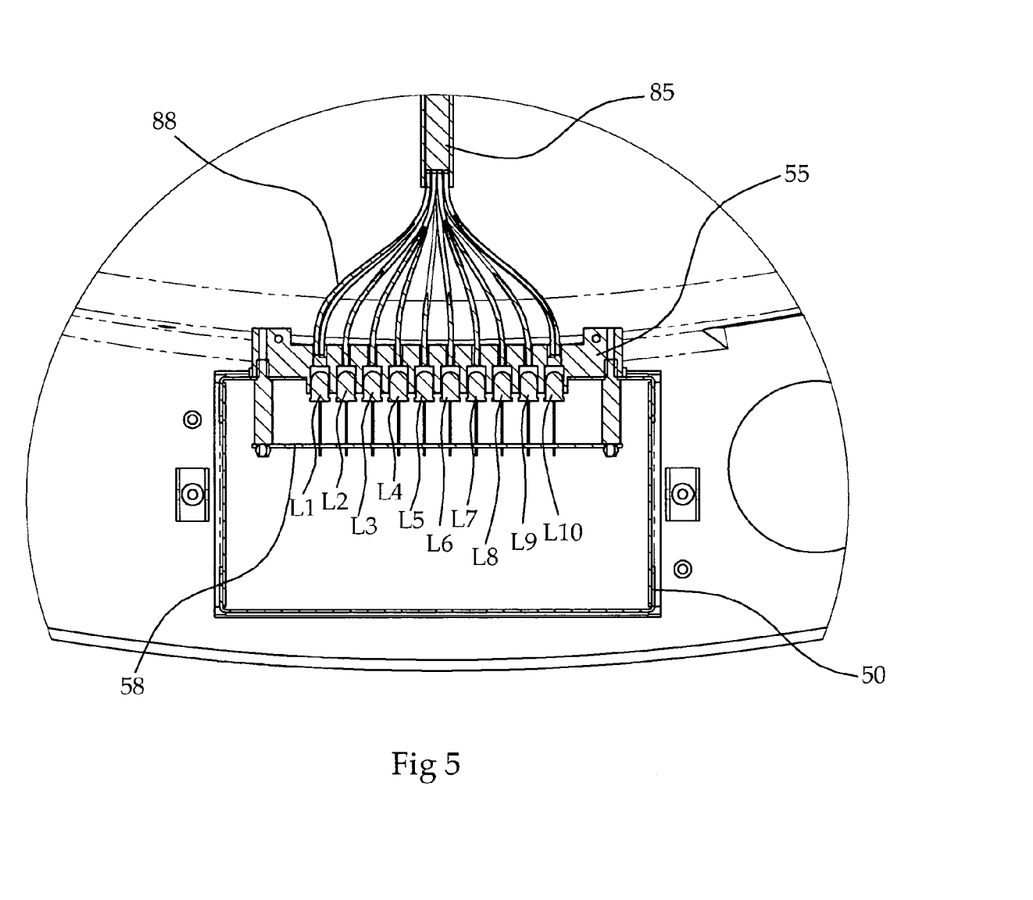
FIG. 5 is a top sectional view of the housing showing the LEDs and the circuit board.

Power receptacle, electrical junction box 40 receives standard 115-volt alternating current from the electrical wiring system of the structure. A converter, plugged into the receptacle supplies low voltage direct current to circuit board 58. FIG. 4 shows a cross-sectional view of circuitry enclosure 50 in which is mounted coupler 55 and circuit board 58. Mounted on circuitry enclosure 50 is a plurality of snap-in panel mounts 56 for circuit board 58 with the LEDs L1–L10 (FIG. 5). Enclosure 50 could be of any desired shape and/or configuration to accommodate space restrictions. As noted above, LEDs generate a measurable amount of heat, which if not dissipated, causes degeneration in the life cycle of the LED. The specially designed multi-LED coupler 55 aligns the LEDs to the fiber optic bundles, and serves an additional function as a heat sink. Light pipes are known in the illumination and electronics industries for transmitting light from LEDs to a panel. As known by those of ordinary skill in the art the LEDs are commonly available from various sources, such as the Oriol DED Dice, (OS450, OS460, etc.) having a typical forward voltage of 3.5 volts at 20 milliamps, a peak wave length of 444 at 20 milliamps and a reverse current of 50 milliamps at 5 volts. The LEDs are typically 5 mm (T 1–3/4).

Figure 6:
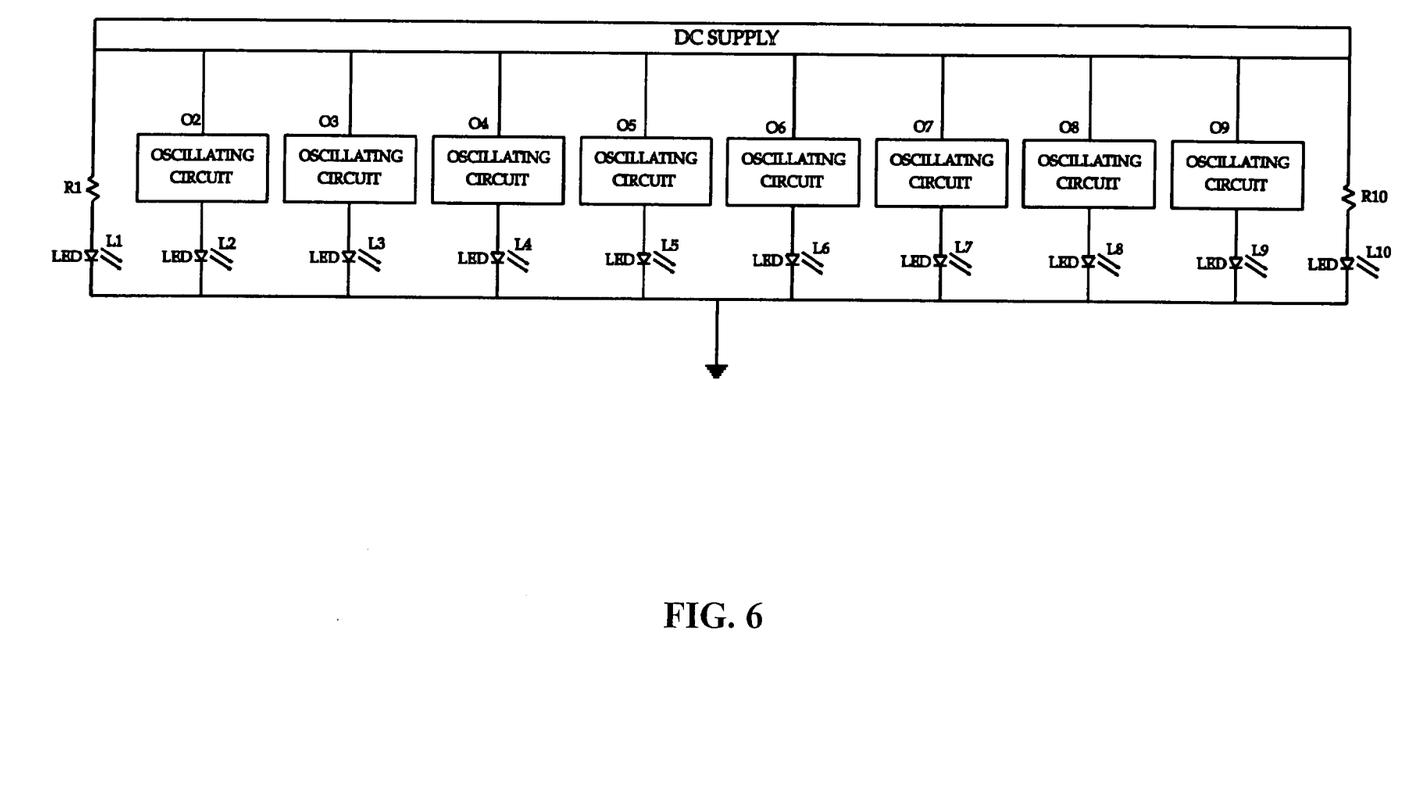
FIG. 6 is a schematic of the light generating system.
Figure 7:
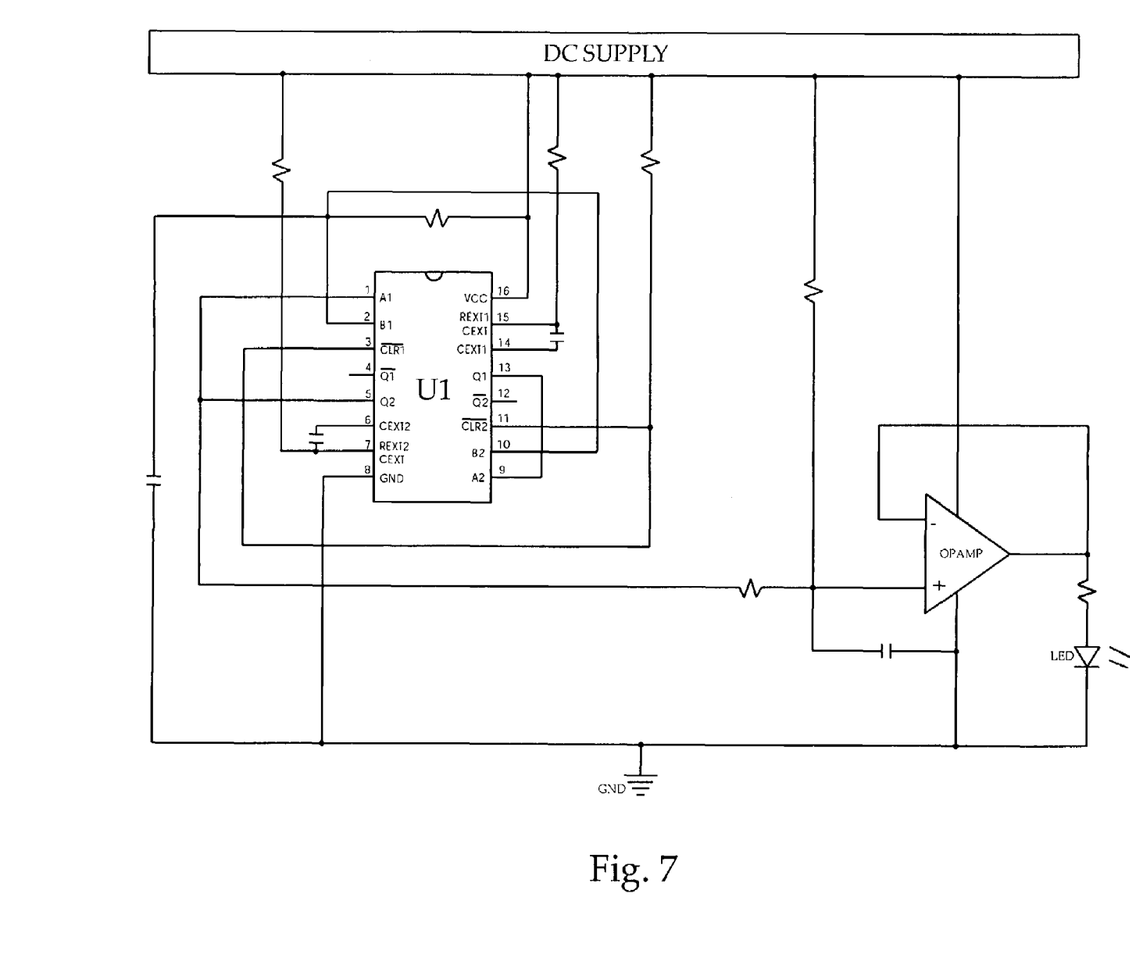
FIG. 7 is a schematic of the individual oscillation circuits of the light generating system.

LEDs L1 through L10 are mounted on coupler 55, which couples the LEDs to fiber optic bundles 85, and which, as noted above, also serves as a heat sink for the purpose of dissipating heat from the LEDs. Circuit board 58 contains the circuitry controlling the intensity of the light emitted by L1 and L10, and oscillating circuits O2–O9 for controlling the intensity of the light emitted from LEDs L2 through L9. FIG. 6 is a schematic of the light controlling circuitry, which depicts a parallel oscillating circuits O2–O9, each in series with an LED L2–L9. In parallel with the oscillating circuits O2–O9 are LEDs L1 and L10, each having a load resister in series. Each of the fiber optic bundles 85 abut with the output light port of its respective LED. FIG. 7 is a schematic drawing of each of the oscillating circuits O2–O9 and their respective, LEDs L2–L9, wherein U1 is a dual retriggerable, monostable multivibrator. Experimentation has revealed that such circuits can be made to oscillate, and can be wired or configured to cause differing light intensity at a selected, predetermined periodicity. Thus, when power is applied to the circuits, light output from LEDs L1 and L10 would be constant, while the light output from LEDs L2–L9 would oscillate between two levels of intensity, providing controlled light enhancement. In the first preferred embodiment, for each LED L2–L9, a digital timing circuit utilizes U1 to generate a fixed frequency bit stream. The digital voltage levels of this bit stream are level shifted to the voltages appropriate to drive the LEDs to the desired level of intensity. Further analog circuitry is used to provide either voltage or current gain, or both. This method was concluded to have been the least expensive. Thus, when the lighting apparatus of the invention is installed in or on a structure having an inner surface 22 painted a dark blue or black, and power applied, the inside surface would appear to be the night sky, with light from the selected stars and planets to be constant, and the light from other stars to be wavering, or "twinkling."

Figure 8:
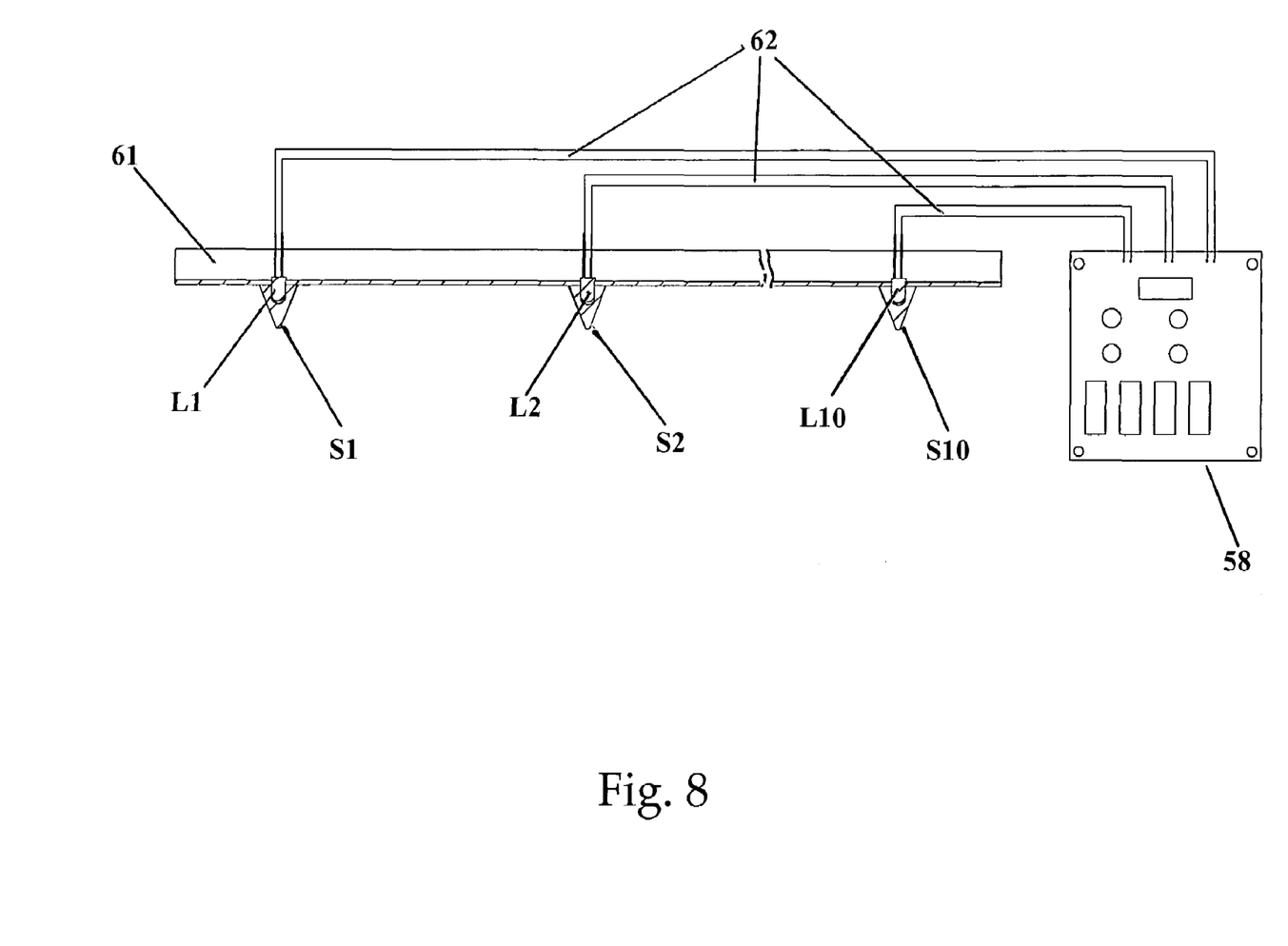
FIG. 8 is a schematic of a panel strip for distributing LEDs.

In a second preferred embodiment of the invention a different light distribution means is employed. In this second embodiment, as shown in FIG. 8, fiber optic bundles 85 for distribution of the light are not necessary, and LEDs L1–L10 have been positioned to reflect light directly at selected surfaces S1–S10. LEDs L1–L10 are distribute to the selected location on the structure by means of panel strip 61 where it is desirable to create a lighting effect, and are wired directly to circuit board 58 by means of electrical leads 62. For example, it may be desired to create a lighting effect on a display within a rectangular frame. LEDs L1–L10, and possibly more or less LEDs, if desired, may be placed on the periphery of the frame, and positioned in such a way that the light reflects on a selected portion of the display. In this embodiment, reflective surfaces S1–S10 are shown adjacent to LEDs L1–L10 for illustrative purposes only. Reflective surfaces S1–S10 may be of any selected size and shape, and may be located adjacent the LEDs or displaced to a selected location. There is no limitation to the number of selected LEDs or reflective surfaces. It should also be noted that the circuit board could be made long and thin to allow it to be placed over the LEDs. When light is reflected on the selected display, and the control circuit activated, the selected display will appear to shimmy. The circuitry controlling the intensity of the light emitted by L1 and L10, and oscillating circuits 02–09 for controlling the intensity of the light emitted from LEDs L2 through L9 remains the same. When the LED's direct light into or on an opaque, transparent or translucent object, a shimmering light effect is created within or on the object. The LED light can also be refracted through or reflected from object to distort the light as it hits the structure. As with the first embodiment, a digital timing circuit may be employed that generates a fixed frequency bit stream which are level shifted to the voltages appropriate to drive the LEDs to the desired level of intensity for controlling the intensity of illumination of at least one of the LED's.

Obviously, numerous modifications and variations of the present invention are possible in light of the above teachings. For example, 1) A waveform generator could be used to generate the fluctuation between two levels of intensity for LEDS L2–L9. Concomitantly, a micro processor or FPGA (field programmable Gate Array), or a PLD (Programmable Logic Device) could be used to provide an appropriate bit stream to a digital to analog converter (DAC). The DAC would decode the bit stream and allow any arbitrary voltage vs. time waveform to be created. In an other embodiment, passive filtering circuitry could be used to derive the appropriate analog waveform from the digital timing waveform. By choosing long time constants, the analog waveform could be made to never fully reach the digital voltage values, resulting in a time averaged version of the digital bitstream. If random timing were required, a high gain analog amplifier configured in open loop could be used to generate the timing signal based on noise statistics. Appropriate time domain filtering with optional hysterisis in the feedback path could be used to tailor the characteristics of the resulting rail-to-rail voltage waveform. In all the embodiments above, further analog circuitry could be used to provide either voltage or current gain, or both.

Future enhancements of the circuitry will include modulation of the analog waveform based on ambient light or sound levels. A photodetector or a microphone would be used to detect the ambient levels. The current from the photodetector or the microphone would be converted in to a voltage of sufficient level to modulate the existing analog voltage or current gain circuitry. The system would then respond in real-time to these changes in light or sound intensity.

While the present description contains much specificity, this should not be construed as limitations on the scope of the invention, but rather as examples of some preferred embodiments thereof. For example, the lighting apparatus could be adapted for use on vertical panels, such as wall hangings, and for external use in signage. Accordingly, the scope of the invention should not be determined by the specific embodiments illustrated herein. The full scope of the invention is further illustrated by the claims appended hereto.

I claim:

1. Apparatus for providing light to a structure, the structure having a plurality of apertures for receiving optical fibers the apparatus comprising:
   (a) a plurality of optical fibers, each said optical fiber having an emitting end and a receiving end, the emitting ends of the optical fibers for mounting in the plurality of apertures, the receiving ends of the optical fibers for spanning to a housing for receiving a control circuit and a plurality of LEDs;
   (b) the control circuit for generating an oscillating sequence of signals for controlling the intensity of illumination of at least one of the LED's between at least two positive levels of illumination; and
   (c) the plurality of LED's arranged such that each LED is juxtaposed adjacent to the receiving end of at least one optical fiber such that the LED's direct light into the receiving end of each said optical fiber connected thereto and such that light from the respective LEDs are directed through the optical fibers and from the emitting ends of the optical fibers.

2. The apparatus of claim 1, wherein at least one said LED is in juxtaposed relationship to the receiving ends of a plurality of optical fibers.

3. The apparatus of claim 1 additionally comprising a first electrical junction box for housing a converter for converting standard house current to low power direct current, the low power direct current for supplying electrical power to the LEDs.

4. The apparatus of claim 1 additionally comprising a housing housing said plurality of LEDs: said housing constructed so as to dissipate heat from said plurality of LEDs.

5. The apparatus of claim 1, wherein the control circuit for generating an oscillating sequence of signals for controlling the intensity of illumination of at least one of the LED's is comprised of a digital timing circuit to generate a fixed frequency bit stream which are level shifted to the voltages appropriate to drive the LEDs to the desired level of intensity.

6. The apparatus of claim 1, wherein the control circuit for generating an oscillating sequence of signals for controlling the intensity of illumination of at least one of the LED's is comprised of a passive filtering circuitry to derive an appropriate analog waveform from a digital timing waveform, and wherein by choosing long time constants, the analog waveform could be made to never fully reach the digital voltage values, resulting in a time averaged version of a digital bit stream.

7. The apparatus of claim 1, wherein the control circuit for generating an oscillating sequence of signals for controlling the intensity of illumination of at least one of the LED's is comprised of a high gain analog amplifier configured in open loop to generate the timing signal based on noise statistics and wherein random timing would be produced.

8. The apparatus of claim 1, wherein the control circuit for generating an oscillating sequence of signals for controlling the intensity of illumination of at least one of the LED's is comprised of time domain filtering with hysterisis in the feedback path to tailor the characteristics of a resulting rail-to-rail voltage waveform.

9. The apparatus of claim 1, wherein the control circuit for generating an oscillating sequence of signals for controlling the intensity of illumination of at least one of the LED's is comprised of a waveform generator.

10. The apparatus of claim 1, wherein the control circuit for generating an oscillating sequence of signals for controlling the intensity of illumination of at least one of the LED's is comprised of a microcomputer to provide an appropriate bit stream to a digital to analog converter (DAC).

11. The apparatus of claim 1, wherein the control circuit for generating an oscillating sequence of signals for controlling the intensity of illumination of at least one of the LED's is comprised of a field programmable grate array (FPGA) to provide an appropriate bit stream to a digital to analog converter (DAC).

12. The apparatus of claim 1, wherein the control circuit for generating an oscillating sequence of signals for controlling the intensity of illumination of at least one of the LED's is comprised of a programmable logic device (PLD) to provide an appropriate bit stream to a digital to analog converter (DAC).

13. Apparatus for providing light to a structure, the structure having a plurality of apertures for receiving optical fibers, the apparatus comprising:
   (a) a plurality of optical fibers, each said optical fiber having an emitting end and a receiving end, the emitting ends of the optical fibers for mounting in the plurality of apertures, the receiving ends of the optical fibers for spanning to a first enclosure for receiving a control circuit and a plurality of LEDs,
   (b) the first enclosure constructed so as to dissipate heat from the LEDs;
   (c) the control circuit for generating an oscillating sequence of signals for controlling the intensity of illumination of at least one of the LED's between at least two positive levels of illumination,
   (d) the plurality of LED's arranged such that each LED is juxtaposed adjacent to the receiving end of at least one optical fiber such that the LED's direct light into the receiving end of each said optical fiber connected thereto and such that light from the respective LEDs are directed through the optical fibers and from the emitting ends of the optical fibers; and (e) a junction box for housing a converter for converting standard house current to low power direct current, the low power direct current for supplying electrical power to the LEDs.

14. The apparatus of claim 13, wherein at least one said LED is in juxtaposed relationship to the receiving ends of a plurality of optical fibers.

15. The apparatus of claim 13, wherein the control circuit for generating an oscillating sequence of signals for controlling the intensity of illumination of at least one of the LED's is comprised of a digital timing circuit to generate a fixed frequency bit stream which are level shifted to the voltages appropriate to drive the LEDs to the desired level of intensity.

16. The apparatus of claim 13, wherein the control circuit for generating an oscillating sequence of signals for controlling the intensity of illumination of at least one of the LED's is comprised of a passive filtering circuitry to derive an appropriate analog waveform from a digital timing waveform, and wherein by choosing long time constants, the analog waveform could be made to never frilly reach the digital voltage values, resulting in a time averaged version of a digital bit stream.

17. The apparatus of claim 13, wherein the control circuit for generating an oscillating sequenc of signals for controlling the intensity of illumination of at least one of the LED's is comprised of a high gain analog amplifier configured in open loop to generate the timing signal based on noise statistics and wherein random timing would be produced.

18. The apparatus of claim 13, wherein the control circuit for generating an oscillating sequence of signals for controlling the intensity of illumination of at least one of the LED's is comprised of time domain filtering with hysterisis in the feedback path to tailor the characteristics of a resulting rail-to-rail voltage waveform.

19. The apparatus of claim 13, wherein the control circuit for generating an oscillating sequence of signals for controlling the intensity of illumination of at least one of the LED's is comprised of a waveform generator.

20. The apparatus of claim 13, wherein the control circuit for generating an oscillating sequence of signals for controlling the intensity of illumination of at least one of the LED's is comprised of a microcomputer to provide an appropriate bit stream to a digital to analog converter (DAC).

21. The apparatus of claim 13, wherein the control circuit for generating an oscillating sequence of signals for controlling the intensity of illumination of at least one of the LED's is comprised of a field programmable gate array (FPGA) to provide an appropriate bit stream to a digital to analog converter (DAC).

22. The apparatus of claim 13, wherein the control circuit for generating an oscillating sequence of signals for controlling the intensity of illumination of at least one of the LED's is comprised of a programmable logic device (PLD) to provide an appropriate bit stream to a digital to analog converter (DAC).

* * * * *